A. GROSCH, Jr.
Lawn-Mowers.
No. 158,273.
Patented Dec. 29, 1874.
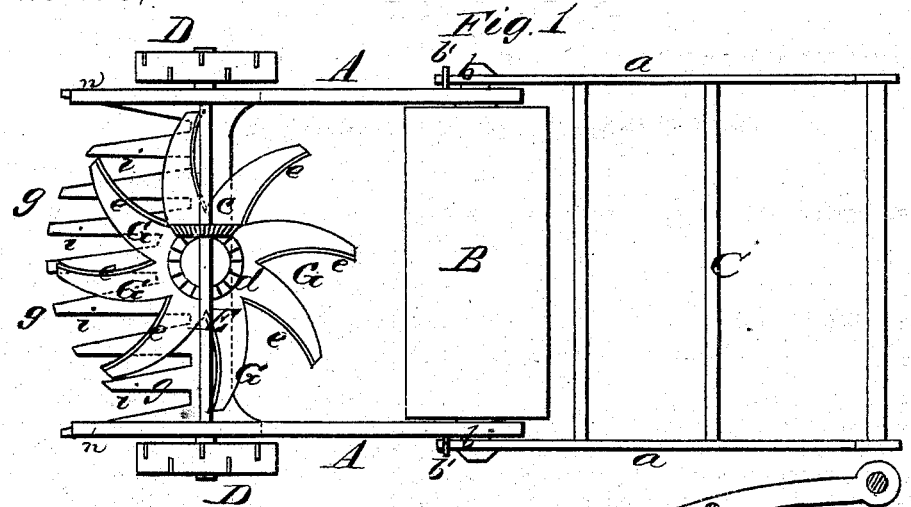
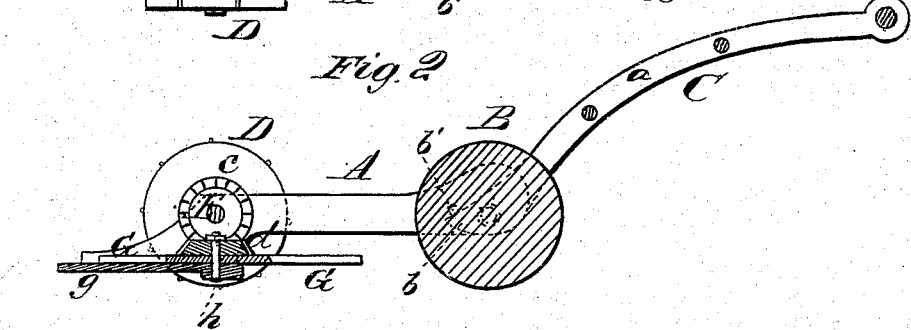
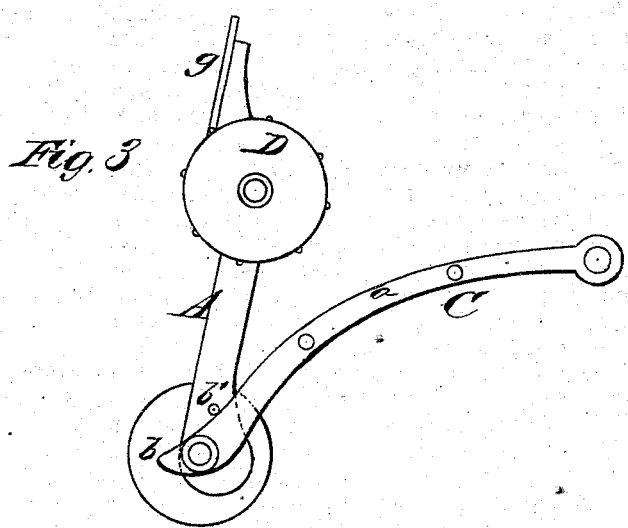
WITNESSES
INVENTOR
A. Grosch Jr
ATTORNEYS

UNITED STATES PATENT OFFICE.

ALEXANDER GROSCH, JR., OF NEW ORLEANS, LOUISIANA.

IMPROVEMENT IN LAWN-MOWERS.

Specification forming part of Letters Patent No. 158,273, dated December 29, 1874; application filed August 20, 1873.

*To all whom it may concern:*

Be it known that I, ALEXANDER GROSCH, Jr., of the city of New Orleans, parish of Orleans and State of Louisiana, have invented a new, useful, and Improved Lawn-Mower; and I hereby declare the following to be a full, clear, and correct description of my invention, reference being had to the accompanying drawing, and to the letters of reference thereon, making a part of this specification, in which—

Figure 1 is a plan or top view, while Fig. 2 is a side elevation thereof.

This invention has relation to lawn-mowers which are moved and controlled altogether by manual power; and it consists in pivoting the frame carrying the cutters, operated by two driving-wheels, to the gudgeons of a transporting-drum, to which the handles are also pivoted, by means of which construction the cutting mechanism and its frame can readily be thrown over the transporting-drum, and the cutting mechanism thereby stopped when it is not desired to cut grass, and the machine is to be removed from the lawn.

In the annexed drawings, A A designate two horizontal side bars, which are parallel to each other, and which constitute the frame of the machine. C designates the handle of the machine, which is composed of two parallel bars, $a$ $a$, connected together by transverse rods. The bars $a$ $a$ are pivoted to the ends of a shaft carrying a drum, B, so that when the machine is not cutting the frame A A can be turned up in the position indicated by Fig. 3, and sustained upon the roller or drum B, in which position of the parts pins $b'$ $b'$ bear on the upper edges of the bars $a$ $a$, thus allowing the machine to be conveniently rolled about without actuating the cutters. When the frame A A is down, as shown in Figs. 1 and 2, the pins $b'$ $b'$ rest upon forward extensions $b$ $b$ of the handle-bars $a$ $a$, thus allowing the cutters to accommodate themselves to the inequalities of the surface passed over, at the same time allowing the attendant to raise the cutters over obstructions. D D are the driving-wheels for rotating the cutting-blades G, which wheels are preferably spurred on their peripheries, as shown, in order to give them the required traction. E designates the shaft on which the wheels D D are keyed, which shaft has its bearings in the side bars A A at the termini of the horizontal portions thereof, and forward of these bearings the bars A A are tapered, so as to form two dividers, $n$ $n$, which gather the grass up to the cutters. On the shaft E is a bevel spur-wheel, $c$, which engages with a similar wheel, $d$, on a short shaft, $h$, which is fixed into the transverse portion of stationary cutters $g$. It is around this shaft $h$ that the cutters G rotate. The cutters are tapered blades radiating from a solid center, and having curved cutting-edges $e$, which gather in the grass, and sever it with a drawing cut against the straight edges $i$ of the stationary cutting-blades $g$. The ends of the blades $g$ terminate in a curve, which is concentric to the axis of the rotary cutters G, and which is about the same radius as that of the cutters G. The cutters $g$, like the cutters G, are made tapering, for the purpose of entering the grass easily, which tapering form is produced by cutting away the metal from the backs of the blades $g$, leaving their cutting-edges at right angles to the shaft E. The drum B should be heavily loaded in order that it shall run steady, and allow the attendant to have complete control of the machine.

Having described my invention, what I claim as new, and desire to secure by Letters Patent, is—

The frame A, pivoted to the gudgeons of the transporting-drum, and provided with the driving-wheels D D on the shaft E, which gives motion to the cutting mechanism, in combination with the drum B and handles C, pivoted to the shaft thereof, by means of which the frame A and cutting mechanism can be thrown over the drum B, and the operation of the cutting mechanism stopped in transporting the machine from place to place on the drum B, substantially as described, and for the purposes set forth.

A. GROSCH, JR.

Witnesses:
H. N. JENKINS,
J. C. HUBBELL.